United States Patent Office 3,368,980
Patented Feb. 13, 1968

3,368,980
METHOD OF PREPARING YTTRIUM OXIDE PHOSPHORS
Frank J. Avella, Flushing, and Frank C. Palilla, Maspeth, N.Y., assignors to General Telephone and Electronics Laboratories, Inc., a corporation of Delaware
No Drawing. Filed Dec. 24, 1964, Ser. No. 421,082
13 Claims. (Cl. 252—301.4)

ABSTRACT OF THE DISCLOSURE

A method of preparing europium-activated yttrium oxide phosphor having a particle size suitable for dusting on cathode ray tube screens. The method includes the step of blending the yttrium and europium oxides with an alkaline earth halide flux. Other rare-earth activated yttrium oxide phosphor compositions having particles of predetermined size may also be prepared by this method.

---

This invention relates to a method of making phosphor compositions and in particular to a method of preparing red-emitting europium-activated yttrium-oxide phosphors of predetermined particle size.

In copending U.S. patent application Ser. No. 371,026 filed May 28, 1964, by J. F. Larson, there is disclosed a color cathode ray tube employing a cathodoluminescent screen arranged for excitation by beams from one or more electron guns. One embodiment of this screen consists of a large number of groups or triads each consisting of three phosphor dots which emit red, green and blue light respectively when excited by an electron beam. As disclosed in the aforementioned application, the red-emitting phosphor dots may be composed of europium-activated yttrium oxide and the blue and green emitting phosphors may be of the well known sulfide types.

One of the most satisfactory methods of making such a screen is by the dusting process disclosed in detail in U.S. Patent 3,025,161 granted to T. V. Rychlewski and entitled "Method of Forming Patterns." In this process, a layer of photosensitive resin such as polyvinyl alcohol is spread over the faceplate of the cathode ray tube. A phosphor is dusted on the photosensitive layer and the resin then exposed to ultraviolet radiation through precisely located openings in a mask. The ultraviolet radiation polymerizes the portions of the photosenstive layer which are not covered by the mask and, when the rest of the layer is washed away, the phosphor dots remain incorporated in the light-fixed polyvinyl alcohol layer coating the faceplate. This process is then repeated with each of the other phosphors to form the screen.

Using the dusting process, best results are obtained with oxide phosphors having an average particle diameter by weight of 15±8 microns with an overall range of 2 to 30 microns permissible as measured by the Coulter Counter technique. This range is desirable because powders of particle sizes less than two microns do not dust well and generally cannot be washed out without contaminating the phosphor dots previously coated on the screen. Also larger particles are not suitable for screening because they do not form uniform dots.

One known method of synthesizing europium-activated yttrium oxide is to fire a mixture consisting only of yttrium oxide and europium oxide or suitable compounds of these elements (such as the nitrates or oxalates) which will decompose to the oxides. A method describing such a preparation is disclosed in copending U.S. patent application Ser. No. 213,859 filed Aug. 1, 1962, by R. A. Lefever et al., now abandoned. However, particles obtained in this way are non-uniform, most of the particles being too small for dusting and others being flake-like. Europium-activated yttrium oxide has also been prepared by the use of a flame-fusion burner of the type described by R. A. Lefever and G. W. Clark in Review of Scientific Instruments, vol. 33, pages 769, 770 (1962). This technique, however, is not easily adapted to production scale quantities.

Another proposed method involves the activation of pre-selected large particles of yttrium oxide with europium. However, this method requires excessively high temperatures to achieve activator incorporation. Even at temperature of about 1700° C., the activator is not incorporated uniformly and the material is relatively inefficient.

Accordingly, it is an object of our invention to provide an improved method of making rare earth activated yttrium oxide phosphors having particles of a desired size.

Another object is to provide a method of making europium-activated yttrium oxide by a process which is suitable to large scale production and which does not require inconveniently high temperatures.

Still another object is to provide a relatively simple method of making europium-activated yttrium oxide which responds efficiently to excitation by cathode rays and which is composed of particles having a size suitable for dusting on cathode ray tube screens.

The determination of the size of individual phosphor particles is complicated by the fact that the particles are not only irregular in shape but the assortment of shapes often differs widely within a given sample. One method of expressing the size of an irregular particle is in terms of its equivalent diameter; i.e. the diameter of a sphere having the same volume as that of the particle. This diameter may be determined by use of suitable measuring apparatus such as the Coulter Counter manufactured by the Coulter Electronics Co., Chicago, Ill., which counts and sizes individual particles suspended within a liquid medium. In this device, the suspended particles are forced to flow through a small aperture of known dimensions having an electrode positioned on each side. As each particle passes through the aperture, it displaces its own volume of electrolyte thereby producing a change in the electrical resistance across the aperture which generates a voltage pulse having an amplitude proportional to the volume of the particle. By the use of appropriate pulse height discrimination equipment, the number of particles having volumes (and therefore equivalent diameters) within predetermined limits may be established. Assuming the density of the particles within any sample to be the same, the average diameter by weight $\bar{d}_w$ is the equivalent of a particle having a weight which is equal to the weight mean for the entire sample. That is, the total weight of the particles having a weight greater than that of a particle of average diameter $\bar{d}_w$ is equal to the total weight of those particles having a weight less than this amount.

The average diameter may also be determined by an actual microscopic count of the particles. In this case the average diameter is $$\bar{d}_w = \frac{\sum N_i d_i^4}{\sum N_i d_i^3}$$

where $N_i$ is the frequency of occurrence of particles having a diameter $d_i$ obtained by averaging the major and the minor dimensions of the particles.

Our invention is directed toward a method of producing yttrium oxide phosphors activated with 0.5 to 10 mole percent of a type $4f$ rare earth element. In particular, the method permits the preparation of rare earth activated yttrium oxide phosphors having average particle diameters $\bar{d}_w$ of approximately $15 \pm 8$ microns which are suitable for dusting on cathodoluminescent screens.

In preparing phosphors by our method, the oxide of yttrium is mixed with one of the oxides of the type $4f$ rare earth elements. This mixture is blended with an alkaline earth halide flux and the blend then fired in a suitable crucible to provide phosphors having particles in the desired range. In this process, the halide acts as a flux to achieve uniform crystal growth.

More specifically, europium activated yttrium oxide phosphors are prepared by mixing between 90 and 99.5 mole percent yttrium oxide ($Y_2O_3$) with 0.5 to 10 mole percent europium oxide ($Eu_2O_3$) and blending the mixtures with an amount of halide flux equal to between 25 and 400 percent by weight $Y_2O_3$ and $Eu_2O_3$. The halide flux may be an alkaline earth halide such as barium, strontium or calcium chloride. The blend is then fired in a covered crucible at a temperature in the range 1100 to 1500° C. for a period of between 1 and 24 hours. After cooling to room temperature, the resultant phosphor is washed in hot water to remove the residual halide.

Barium chloride proved to be the best flux in that it produced phosphors having the desired particle size together with excellent luminescence brightness and was not destructive to the quartz crucible in which the blend was fired. At a weight ratio of two parts of barium chloride to one of $Y_2O_3+Eu_2O_3$ and at firing conditions of 1200° C. for 16 hours, an average particle diameter of 13 microns was obtained as measured by the Coulter Counter.

Using $BaCl_2$ as the flux, it has been found that the presence of silica ($SiO_2$) is essential to good growth and efficient luminescence of the phosphor. The role of the $SiO_2$ in the reaction is not fully understood but it is believed that it forms an intermediate, easily decomposable chloride which aids in the diffusion process or provides nucleation sites about which the crystallites can grow. One of the most satisfactory methods of introducing $SiO_2$ into the reaction is to fire the blend in a quartz (fused $SiO_2$) crucible. Synthesis of europium-activated yttrium oxide in crucibles other than quartz is performed with additions of silica powder. This produces somewhat larger particles with good luminescent properties. However, for producing particles having average diameters $\bar{d}_w$ of 13 microns or less, the slow continuous attack of the halide flux on a relatively unchanging silica area, such as is presented by the walls of a quartz crucible, was found preferable to the use of silica powder in an alumina or platinum crucible.

The above objects of and the brief introduction to the present invention will be more fully understood and further objects and advantages will become apparent from a study of the following examples.

*Example I*

A batch of europium activated yttrium oxide having the composition $(Y_{0.95}Eu_{0.05})_2O_3$ was prepared by dry-blending 27.75 grams of $Y_2O_3$ (99.999 percent purity) and 2.25 grams $Eu_2O_3$ (99.9 percent purity) with 15.0 grams of reagent grade $BaCl_2$. This formulation corresponds to 50 percent by weight of flux to the total weight of $Y_2O_3+Eu_2O_3$. The blend was then fired in a covered 50 milliliter quartz crucible, in a muffle furnace, at 1200° C. for 16 hours. The fired charges were washed with boiling distilled water by decantation eight times until the wash water proved free of chloride ions. The material was then dried at 110–120° C. for about 12 hours and finally sieved through a 325 mesh screen to remove the oversize fraction. The resultant particles averaged about 8 microns in diameter and ranged from 2 to 20 microns.

For the purpose of comparison, the cathodoluminescent and photoluminescent intensity of the phosphor made by this method was compared with that prepared by firing the mixed oxalates of yttrium and europium. It was found that phosphors prepared using the oxalates had a large population of fines and plate-like particles whereas the flux-grown particles are quite uniform and tend to be more spherical. Comparisons were also made with samples prepared directly from the oxides but to which no flux addition had been made. In this case there was no evidence of particle size growth and the response to ultraviolet excitation (2537 Angstroms) was low.

Cathodoluminescent intensity for the phosphor made by the method of Example I measured 130 percent that of europium-activated yttrium oxide prepared by firing the mixed oxides without barium chloride at 1700° C. for 3 hours and equaled that of the phosphor prepared by firing the mixed oxalates of yttrium and europium without flux. Photoluminescence intensity under 2537 Angstroms excitation measured 85 percent that of europium-activated yttrium oxide prepared by firing mixed oxalates without flux.

*Example II*

Example I was repeated except that 3.0 grams of $BaCl_2$ were blended with 11.1 grams of $Y_2O_3$ and 0.9 gram of $Eu_2O_3$ to provide a mixture having approximately 25 percent by weight of barium chloride to the total weight of $Y_2O_3+Eu_2O_3$. After firing, washing and sieving in accordance with Example I it was found that the resultant phosphor particles had an average diameter of about 8 microns together with a rather large population of fines. Photo- and cathodoluminescent properties were similar to those obtained for the phosphor of Example I.

*Example III*

27.75 grams $Y_2O_3$, 2.25 grams $Eu_2O_3$ and 40.0 grams of $BaCl_2$ (133 percent of the total by weight of $Y_2O_3+Eu_2O_3$) of the same grade as that of Example I were dry-blended with 0.4 gram of dried reagent grade silicic acid ($SiO_2$). The blend was placed in a 50 milliliter covered alumina crucible and fired at 1200° C. for 16 hours after which it was washed and sieved in the manner described in Example I.

The resultant particles averaged about 15 microns in diameter with a range between 5 and 30 microns. Cathodoluminescent intensity was 105 percent of the value obtained by firing the mixed oxides at 1700° C. Photoluminescent intensity measured 90 percent of that obtained from phosphor made by the oxalate method.

*Example IV*

Example III was repeated except that 24.0 grams (200 percent by weight of $Y_2O_3+Eu_2O_3$) of $BaCl_2$ were used. Example III was also followed using 48 grams (400 weight percent) $BaCl_2$. In each case the results were substantially the same as those obtained in Example III except that with 400 percent $BaCl_2$ there were more fines and the luminescent properties of the phosphor were somewhat poorer.

*Example V*

A batch of europium-activated yttrium oxide was made in accordance with Example I except that 27.5 weight percent $CaCl_2$ by weight of $Y_2O_3+Eu_2O_3$ were incorporated into the blend instead of $BaCl_2$ and an alumina crucible was used instead of quartz. The average particle size was in the range 5 to 10 microns and the photoluminescence under 2537 Angstrom excitation was 94 percent that of the material prepared from the oxalates.

*Example VI*

Example V was repeated except that this time 100 weight percent CaCl₂ was used as a flux and the blend was fired in a quartz crucible. The average diameter of the particles obtained was approximately 15 microns with a range of 10 to 25 microns. Photoluminescence under 2537 Angstrom excitation was about 71 percent of that obtained from the material prepared from the oxalates.

*Example VII*

Example V was repeated except that 100 weight percent strontium chloride was used as the flux. The resultant phosphor particles had an average diameter of 10 microns with a range of 2 to 20 microns. Under 2537 Angstrom excitation the photoluminescence intensity equaled that of the material prepared from the oxalates.

*Example VIII*

The effect of variation in the ratio of $Y_2O_3$ to $Eu_2O_3$ on the cathodoluminescent emission of the phosphor was determined for phosphors prepared with 133 weight percent $BaCl_2$ and two weight percent $SiO_2$ fired in a Pt-Rh crucible at 1200° C. for 16 hours. Under excitation by an electron beam having a current density of 0.5 microampere per square centimeter of phosphor surface, it was seen that the brightest red emission was obtained for 5 mole percent $Eu_2O_3$.

With 2 mole percent $Eu_2O_3$, the red emission intensity was 89 percent that of the 5 mole percent sample, and with 95 mole percent the emission intensity fell to 64 percent of the 5 mole percent sample.

As many changes could be made in the above described processes it is intended that all matter contained therein shall be interpreted as illustrative and not in a limiting sense.

What is claimed is:
1. A method of preparing europium-activated yttrium oxide phosphors having particles of predetermined size comprising the steps of
   (a) mixing 90 to 99.5 mole percent yttrium oxide with between 0.5 and 10 mole percent europium oxide,
   (b) blending said mixture with an alkaline earth halide flux, said flux having a weight between 25 and 400 percent of said mixture, and
   (c) firing said blend in the presence of silica at a temperature in the range 1100 to 1500° C.
2. A method of preparing a rare earth activated yttrium oxide phosphor composition having particles of predetermined size comprising the steps of
   (a) mixing yttrium oxide with between 0.5 and 10 mole percent of the oxide of a rare earth element,
   (b) blending said mixture with an alkaline earth halide flux selected from the group consisting of barium chloride, strontium chloride and calcium chloride, said flux having a weight between 25 and 400 percent of said mixture, and
   (c) firing said blend in the presence of silica at a temperature in the range 1100 to 1500° C.
3. A method of preparing europium-activated yttrium oxide phosphors having particles of predetermined size comprising the steps of
   (a) mixing yttrium oxide of a rare earth element, between 0.5 and 10 mole percent europium oxide,
   (b) blending said mixture with an alkaline earth halide flux selected from the group consisting of barium chloride, strontium chloride and calcium chloride, said flux having a weight between 25 and 400 percent of said mixture,
   (c) firing said blend in the presence of silica at a temperature in the range 1100 to 1500° C. for between 1 and 24 hours, and
   (d) allowing said blend to cool to room temperature.
4. A method of preparing europium-activated yttrium oxide phosphors having particles of predetermined size comprising the steps of
   (a) mixing 90 to 99.5 mole percent yttrium oxide with between 0.5 and 10 mole percent europium oxide,
   (b) blending said mixture with a barium chloride flux, said flux having a weight between 25 and 400 percent of said mixture,
   (c) firing said blend in a quartz crucible to a temperature in the range 1100° to 1500° C. for between 1 and 24 hours, and
   (d) allowing said blend to cool to room temperature.
5. The method of preparing europium-activated yttrium oxide disclosed in claim 4 wherein the weight of barium chloride flux is 200 percent that of the weight of the mixture of yttrium and europium oxides.
6. The method of preparing europium-activated yttrium oxide disclosed in claim 4 wherein the weight of barium chloride is 50 percent that of the weight of the mixture of yttrium and europium oxides.
7. A method of preparing europium-activated yttrium oxide phosphors having particles of predetermined size comprisng the steps of
   (a) mixing 90 to 99.5 mole percent yttrium oxide with 0.5 to 10 mole percent europium oxide with barium chloride and silica, said barium chloride having a weight equal to 133 percent of the total weight of yttrium oxide and europium oxide,
   (b) firing said blend in an alumina crucible at a temperature in the range 1100° to 1500° C. for about 16 hours, and
   (c) allowing the resulting phosphor to cool.
8. The method of preparing europium-activated yttrium oxide disclosed in claim 7 wherein the weight of barium chloride is 200 percent that of the weight of the mixture of yttrium and europium oxides.
9. The method of preparing europium-activated yttrium oxide disclosed in claim 7 wherein the weight of barium chloride is 400 percent that of the weight of the mixture of yttrium and europium oxides.
10. A method of preparing europium-activated yttrium oxide phosphors having particles of predetermined size comprising the steps of
    (a) mixing 95 mole percent yttrium oxide with 5 mole percent europium oxide,
    (b) blending said mixture with a barium chloride flux, said flux having a weight equal to 50 percent of the weight of said mixture,
    (c) firing said blend in a quartz crucible at 1200° C. for 16 hours,
    (d) allowing the resulting phosphor to cool,
    (e) washing said phosphor until it is free of chloride ions, and
    (f) drying said phosphor.
11. A method of preparing europium-activated yttrium oxide phosphors having particles of predetermined size comprising the steps of
    (a) mixing 90 to 99.5 mole percent yttrium oxide with between 0.5 and 10 mole percent europium oxide,
    (b) blending said mixture with a calcium chloride flux, said flux having a weight between 25 and 400 percent of said mixture, and
    (c) firing said blend in a quartz crucible to a temperature in the range 1100° to 1500° C. for between 1 and 24 hours.
12. The method of preparing europium-activated yttrium oxide disclosed in claim 11 wherein the weight of calcium chloride is 100 percent that of the weight of the mixture of yttrium and europium oxides.
13. A method of preparing europium-activated yttrium oxide phosphors having particles of predetermined size comprising the steps of
(a) mixing 90 to 99.5 mole percent yttrium oxide with between 0.5 and 10 mole percent europium oxide,
(b) blending said mixture with strontium chloride flux, said flux having a weight between 25 and 400 percent of said mixture, and
(c) firing said blend in a quartz crucible to a temperature in the range 1100° to 1500° C. for between 1 and 24 hours.

References Cited

UNITED STATES PATENTS

| | | | |
|---|---|---|---|
| 2,546,239 | 3/1951 | Rothschild | 252—301.6 |
| 2,729,606 | 1/1956 | Rothschild | 252—301.5 |
| 2,758,094 | 8/1956 | Ranby | 252—301.4 |
| 2,982,740 | 5/1961 | Goldberg et al. | 252—301.6 |
| 3,017,365 | 6/1962 | Harrison | 252—301.4 |
| 3,147,226 | 9/1964 | Jonck | 252—301.3 |
| 3,157,602 | 11/1964 | Ropp | 252—301.4 |
| 3,250,722 | 5/1966 | Borchradt | 252—301.4 |
| 3,294,701 | 11/1966 | Vogel et al. | 252—301.4 |

OTHER REFERENCES

Leverenez: Luminescence of Solids, 1950, pp. 48–51.

TOBIAS E. LEVOW, *Primary Examiner.*

ROBERT D. EDMONDS, *Examiner.*